United States Patent [19]
Downing, Jr. et al.

[11] Patent Number: 5,427,268
[45] Date of Patent: Jun. 27, 1995

[54] CERAMIC PRESSURE HOUSING WITH METAL ENDCAPS

[75] Inventors: John P. Downing, Jr., Port Townsand, Wash.; Bradley G. DeRoos, Worthington; Donald J. Hackman, Columbus, both of Ohio

[73] Assignee: Battelle Memorial Institute, Richland, Wash.

[21] Appl. No.: 78,363

[22] Filed: Jun. 16, 1993

[51] Int. Cl.$^6$ .............................................. B65D 1/16
[52] U.S. Cl. .................................. 220/581; 220/611; 220/612; 220/614; 220/617
[58] Field of Search ............... 220/581, 611, 612, 614, 220/617, 621, 620

[56] References Cited

U.S. PATENT DOCUMENTS

| | | | |
|---|---|---|---|
| 2,389,534 | 11/1945 | O'Brian | 220/617 |
| 2,867,358 | 1/1959 | Meshberg | 220/621 |
| 3,315,839 | 4/1967 | Catalano et al. | 220/617 |
| 3,452,897 | 7/1969 | Anthony | 220/621 |
| 4,886,181 | 12/1989 | Haines | 220/617 |
| 4,982,870 | 1/1991 | Van Loon | 220/617 |

OTHER PUBLICATIONS

Design of a Deep-Ocean Pressure Case Using a Ceramic Tube, Ceramic Bulletin, vol. 46, No. 12, C. R. B. Lister, 1967.
Ceramic Housing for Deep Submergence Application, Conf. Proc. of ROV-90, Jun. 25-27, 1990, J. D. Stachiw, p. 316.
Glass and Ceramics for Underwater Structures, Ceramic Age, Jul. 1964, p. 20.
Engineering Criteria Used in the Selection of Ceramic . . . Conf. Proc. ROV-90, Jun. 25-27, 1990, J. D. Stachiw, 1991, p. 132.
Pressure Resistant Ceramic Housings for . . . , J. D. Stachiw, MTS Journal, vol. 24, No. 2, p. 59.
Ceramic Hull Reliability . . . Conf. Proc., ROV-90, Jun. 25-27, 1990, P. C. Smith, 1991, p. 155.
Ceramic Hull Fabrication Methods, Conf. Proc., ROV-90, Jun. 25-27, 1990, P. C. Smith, 1991, p. 166.
Use of Extended-Chain Polyethylene (ECPE) . . . Conf, proc. ROV-90, Jun. 25-27, 1990, Sloan and Nguyen, 1991, p. 173.
Stress Analysis Considerations for . . . Conf, Proc. ROV-90, R. P. Johnson, 1991, p. 151.
Elastic Stability Consideration for Deep . . . Conf, Proc., ROV-90, Jun. 1990, R. R. Kurkchubasche, 1991, p. 143.

*Primary Examiner*—Joseph Man-Fu Moy
*Attorney, Agent, or Firm*—Johnnie R. Hynson

[57] ABSTRACT

A housing for the containment of instrumentation in a high pressure fluid environment that consists of a metallic endcap and ceramic cylinder bonded together. The improvement comprises a structure which results in the improved sealing of said housing as the fluid pressure increases. The cylindrical ceramic tube and endcap are dimensioned such that mechanical failure does not occur when exposed to the desired external operating pressures which includes up to 36,000 feet of water. The housing is designed to withstand the external operating pressures without being subject to mechanical failure or excessive deformation which results in the loss of pressure housing integrity via cracking or deformation of the ceramic tube, deformation of the endcap, or from failure of the bonding agent.

5 Claims, 9 Drawing Sheets

CERAMIC PRESSURE HOUSING WITH METAL ENDCAPS

STATEMENT OF GOVERNMENT INTEREST

This invention was made with Government support under Contract DE-AC06-76RLO 1830 awarded by the U.S. Department of Energy. The Government has certain rights in the invention.

FIELD OF THE INVENTION

This invention relates generally to a ceramic pressure housing whose sealing ability increases with increases in external pressure. More specifically, the invention relates to a ceramic pressure housing having permanently bonded metal endcaps used in oceanographic research or other high pressure fluid environments.

BACKGROUND OF THE INVENTION

Oceanographic research uses sensing devices for the determination of parameters including but not limited to temperature, salinity, and the presence of solutes. Such devices to record or transmit data underwater will require housings. The sensing devices are housed within a container adapted to withstand the oceanic hydrostatic pressure that increases as depth increases. Deep ocean research therefore demands housings for instrumentation or sensors that can withstand pressures found at depths up to 36,000 feet of water.

Providing pressure protection for electrical, electronic, and mechanical components in a high-pressure fluid environment is in many cases essential to maintaining proper performance of these components. Undersea instrumentation packages and other submersibles are subjected to pressure in direct relation to the depth at which they are being used.

In underwater sensing systems, the instruments and the other fixtures contained in the pressure housings often require that specific structural considerations be examined. These structural considerations, in many instances, require that it is necessary to minimize overall system size or weight in order to simplify system handling, launch, or recovery operations as well as to reduce cost.

Some underwater systems require that the overall system be neutrally buoyant, and in some cases slightly negative, or even positive. This buoyancy is typically achieved in one of two ways: 1) by either supplying buoyant material, or 2) the empty volume by within the system. Therefore, minimizing the weight of a system also allows for a reduction in the buoyant material or in the structural volume required to achieve the overall desired state of system buoyancy. An example of such a system is an oceanographic instrument package which must be neutrally buoyant during its operation. Decreasing the weight of the pressure housings would allow the volume of the system, as a whole, to be reduced. The volume, of a cylinder for example, can be reduced by either reducing the diameter, the length, or both. This reduction results in less water that has to be displaced to achieve the overall buoyant force requirement. A reduced diameter may also result in other advantages, such as decreased system size, extended mission duration, or simplified handling. Also, the cost of underwater pressure housings increases dramatically as the size increases. This illustrates a principle advantage of the instant invention over the prior art. The use of ceramic cylinders in pressure housings allows for a reduction in weight and is well known in the prior art. See *Design of a Deep-Ocean Pressure Case Using a Ceramic Tube,* Ceramic Bulletin, Vol. 46, No. 12, C.R.B. Lister, 1967. However, the effective use of ceramic cylinders requires specific techniques that are within the embodiments of the instant invention.

Certain ceramic materials have been found to be desirable for the fabrication of pressure housings due to their impermeability, high-compressive strength, low cost, and ease of fabrication. In order to provide pressure protection, cylindrical pressure housings must be sealed by endcaps to complete the pressure boundary. Electrical or mechanical penetrations must often be made through these endcaps via electrical connectors or mechanical feedthroughs. There is a continuing need for pressure housings that assure reliable long-term operation at low cost.

The housings, now in use in the prior art, are typically built using Titanium (6AL-4V), Aluminum alloy (6061 or 7075) or stainless steel (303, 304, or 316) with O-ring seals. The disadvantage of the prior art is that those pressure housings have complex titanium rings bonded to the ceramic housing (using epoxy based adhesive) with a secondary O-ring seal incorporated to provide final sealing. Such housings have several important disadvantages. In addition to having a complicated double ring sealing system, those that use ceramic cylinders must be machined, which is very expensive.

The housings described herein do not require machining following the firing of the ceramic material. Machining of ceramics which have already been fired is a costly and time-consuming process.

The housing described herein also is low in cost when compared to the conventional machining methods that require very tight tolerances be maintained.

SUMMARY OF THE INVENTION

The present invention is a comparatively low cost pressure housing fabricated from ceramic tubes, metallic endcaps, and a bonding agent which both mechanically joins and fixes the metallic end cap to the ceramic tube and provides a mechanical pressure seal to prevent leakage of liquid or gas into the assembled pressure housing.

The first step is providing an impermeable cylindrical ceramic tube with an overall length, inside diameter, and outside diameter dimensioned such that mechanical failure does not occur when exposed to the desired external operating pressures.

The use of ceramics allows the maximizing of the interior dimensions for a given external dimension due to the high compressive strength of the ceramic material used to construct the cylinder. This is because the high compressive strength allows the use of a smaller thickness to withstand a given pressure.

These dimensions may be determined using standard engineering design practices, giving consideration to the instruments that will be housed. To this ceramic tube is bonded a metallic endcap so designed as to withstand the external operating pressures without being subject to mechanical failure or excessive deformation which results in the loss of pressure housing integrity via cracking or deformation of the ceramic tube, deformation of the endcap, or from failure of the bonding agent. By proper design of this endcap, the bonding agent used is able to maintain both structural integrity and pressure sealing ability throughout the life of the pressure housing. The bonding agent selected for this purpose may be, for example, an isocyanate-terminated polyurethane prepolymer or a filled epoxy casting system, dependant on the endcap design selected.

The instant invention will be able to withstand a high external pressure and will be low in cost to fabricate in both raw materials and labor hours. Another advantage is the housing will have a low weight to displacement ratio.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENTS

Figure 1:
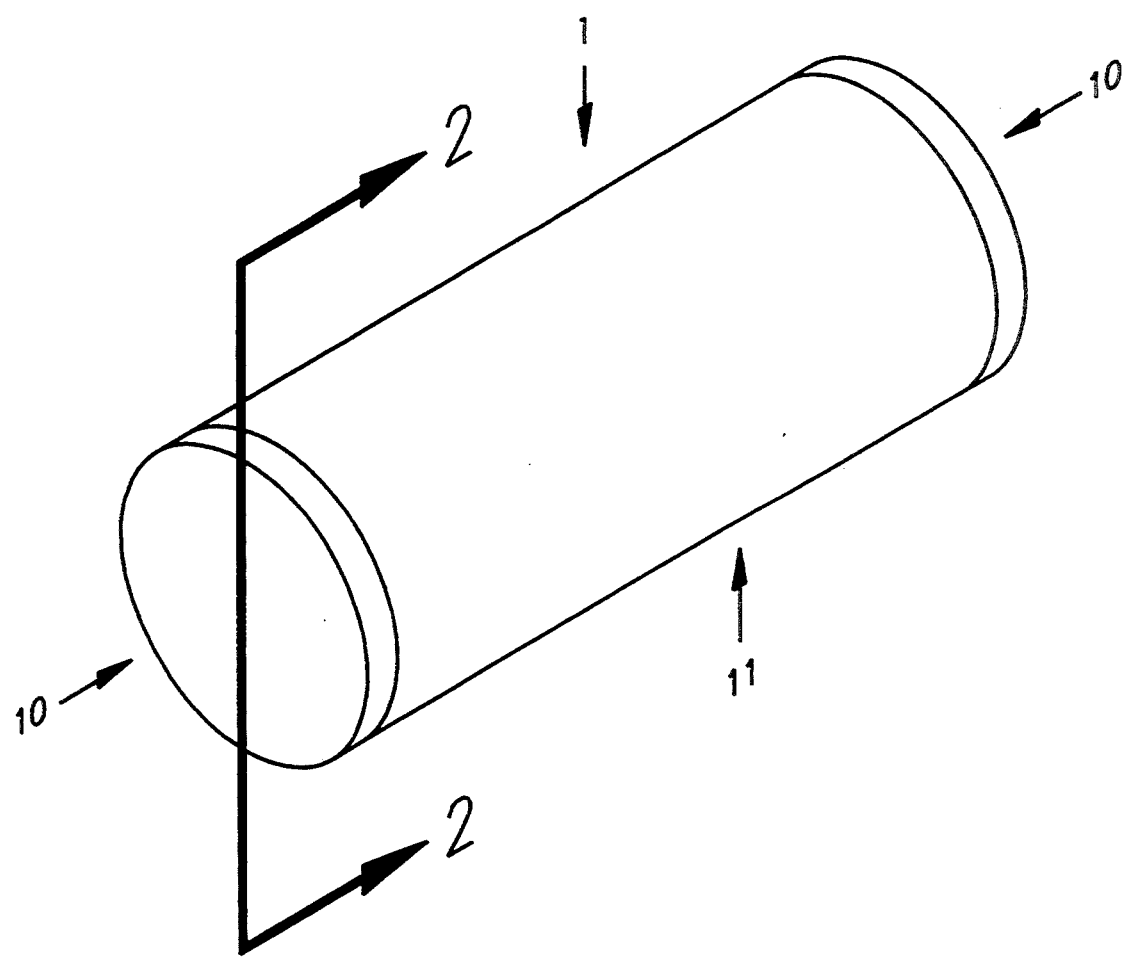
FIG. 1 is an isometric view of the ceramic cylinder pressure housing with permanently bonded metal endcaps.

FIG. 1 illustrates an assembled view of the ceramic pressure housing 1 that embodies the instant invention.

FIRST EMBODIMENT

Figure 2:
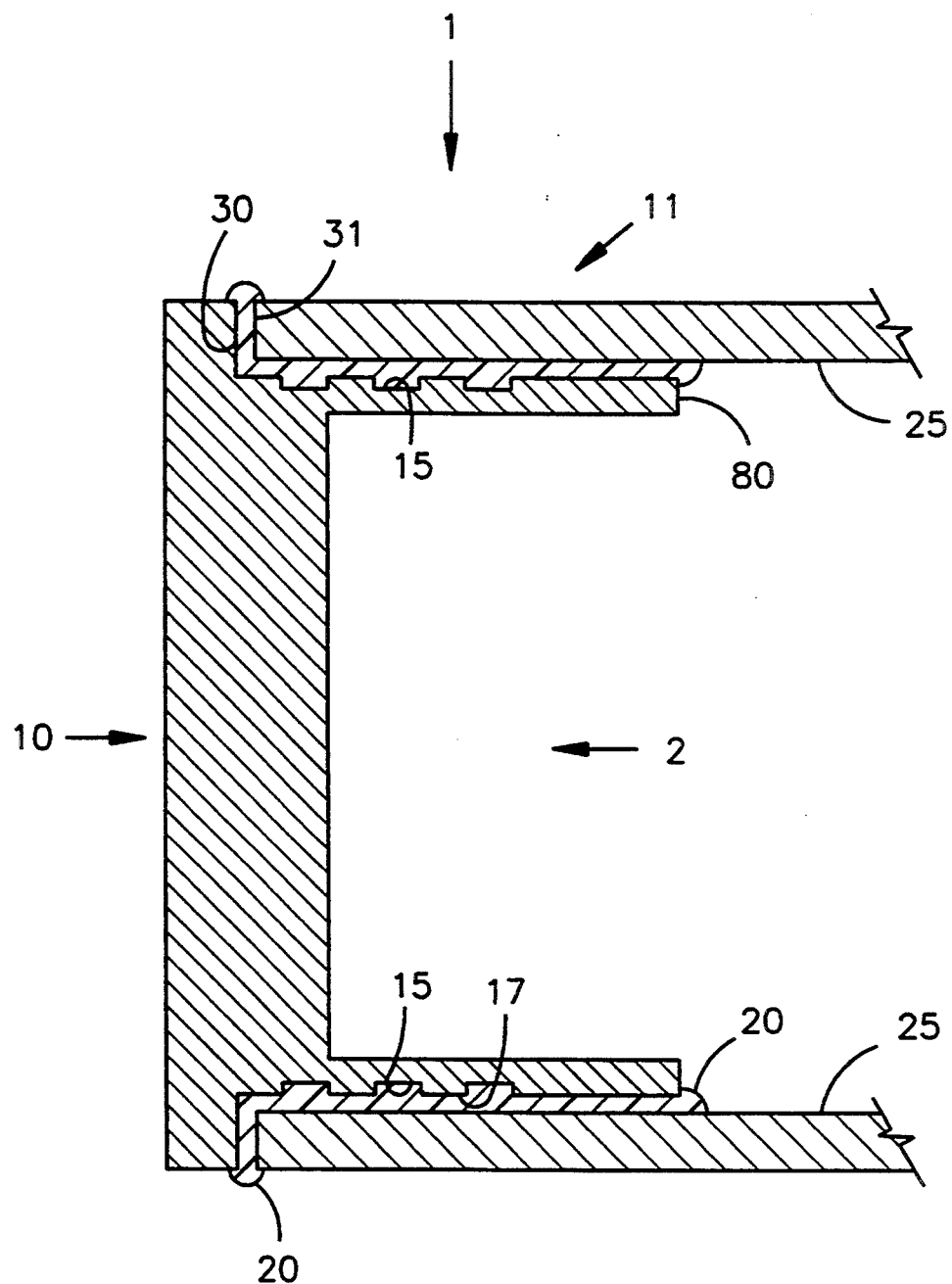
FIG. 2 is a partial cross sectional view along line 2—2 illustrating the ceramic cylinder pressure housing with permanently bonded metal endcaps.
Figure 3:
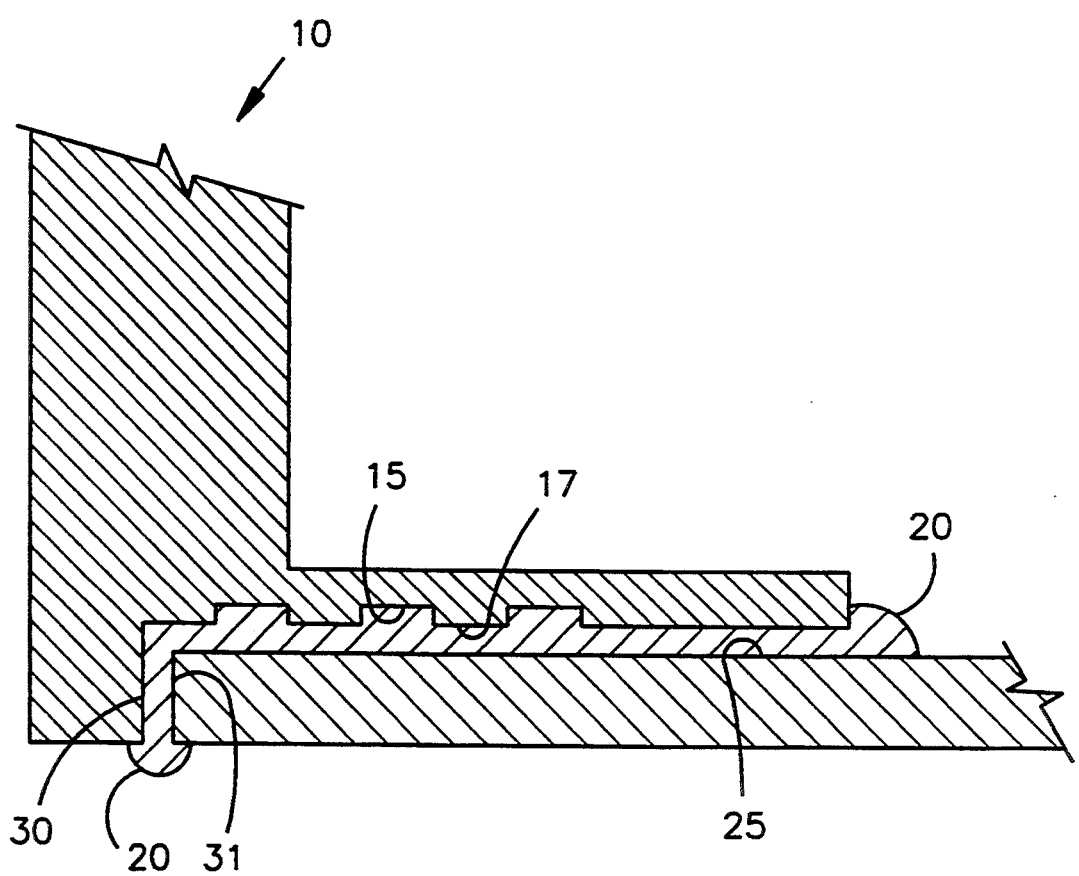
FIG. 3 is an enlarged partial cross sectional view along line 2—2 illustrating the ceramic cylinder pressure housing with permanently bonded metal endcaps shown in FIG. 2.

FIG. 2 illustrates a first embodiment which comprises at least one metallic endcap 10 placed in a ceramic cylinder 11. In the preferred embodiment the metallic endcap 10 will be machined with endcap grooves A bonding agent 20 is applied along the endcap sealing surface 17 onto which is machined the endcap grooves 15, and the ceramic cylinder inner surface 25. FIG. 3 is a partial enlargement of FIG. 2 that more specifically illustrates the location of the bonding agent 20 interspaced between the metallic endcap be and the ceramic cylinder 11. A load bearing portion of the bonding agent 20 is also interspaced between the endcap lip 30 and the ceramic cylinder end surface 31.

The machining of the endcap grooves 15 improves the ability of the ceramic pressure housing 1 in the prevention of fluid, under pressure, from entering the interior portion 2 of the ceramic pressure housing 1. This enhanced ability to seal is due, in part, to the tortuous path created by the grooves, and along with the design that maximizes the bonding surface area between the endcap and bonding agent 20, it will mechanically reduce the chances of leakage. The increase in sealing ability is accomplished on the load bearing portion of the bonding agent 20 that is interspaced between the endcap lip 30 and the ceramic cylinder end surface being placed in compression, which thereby increases the integrity of the seal. The tortuous path generated by machining the metallic endcap 10 also minimizes the chance for leakage. The method of machining the endcaps 10 to the shape disclosed, and the manner of sizing the ceramic cylinder 11 to precise dimensions, along with the uniform application of the bonding agent yields the surprising result of minimizing the fretting and cracking of the ceramic tube. Fretting is experienced when there is uneven loading of surfaces between the endcaps 10 and the ceramic cylinder 11. The use of stiff material for the endcap prevents this from occurring. Also the endcap lip 30 and the ceramic cylinder end surface 31 are ground flat which further limits the fretting. Additionally, the ceramic cylinder 11 is round, to within 0.050 inches, and is therefore not predisposed to bending when compressed. And finally the endcap 11 covers the entire end of ceramic cylinder 11 which further limits fretting.

Some prior art was able to limit the fretting. However, this was by using an arrangement of the direct radial and axial contacts between the ceramic cylinder and a metallic joint stiffener ring. See *Ceramic Housing for Deep Submergence Applications,* Conference Proceedings of ROV-90 held from Jun. 25 to Jun. 27, 1990, in Vancouver B.C., J. D. Stachiw, 1991, at page 316.

The tortuous path is also advantageous and unique in that it prevents progressive peeling of the bonding agent from the endcap under the influence of external pressure which is a common failure mechanism. This is accomplished by the numerous right angle turns which serve to interrupt progressive peeling, if it should start. Grooves are in the endcap sealing surface 17 to increase the peel strength of the bonding agent to the endcap be. These are necessary to give both the endcap 10 and the ceramic cylinder 11 more similar values of peel strength. It is well known in the art that ceramics have a higher peel strength than does metals.

The endcap lip 30 provides a load bearing surface at the ceramic cylinder end surface 31. The thickness of this lip is sized such that mechanical failure of the endcap lip does not occur at the design pressures under consideration. The bonding agent 20 compressed between the endcap lip 30 and the ceramic cylinder end surface 31 provides a seal which is compressed if the ceramic pressure housing 1 is placed under pressure in a fluid environment. Compression of the bonding agent 20 further improves the seal.

As the accuracy of the machining and shaping of all parts of the apparatus increases, the integrity of the pressure seal increases. It is particularly important to have the ceramic cylinder end surface 31 ground flat prior to assembly to allow the pressure boundary, between the inside of the ceramic pressure housing 1 and the high pressure fluid environment, to be formed as uniformly as possible. The cylinder end surface 31 should be perpendicular to the centerline of the ceramic cylinder 11 being maintained within less than 0.001 of one inch.

SECOND EMBODIMENT

Figure 4:
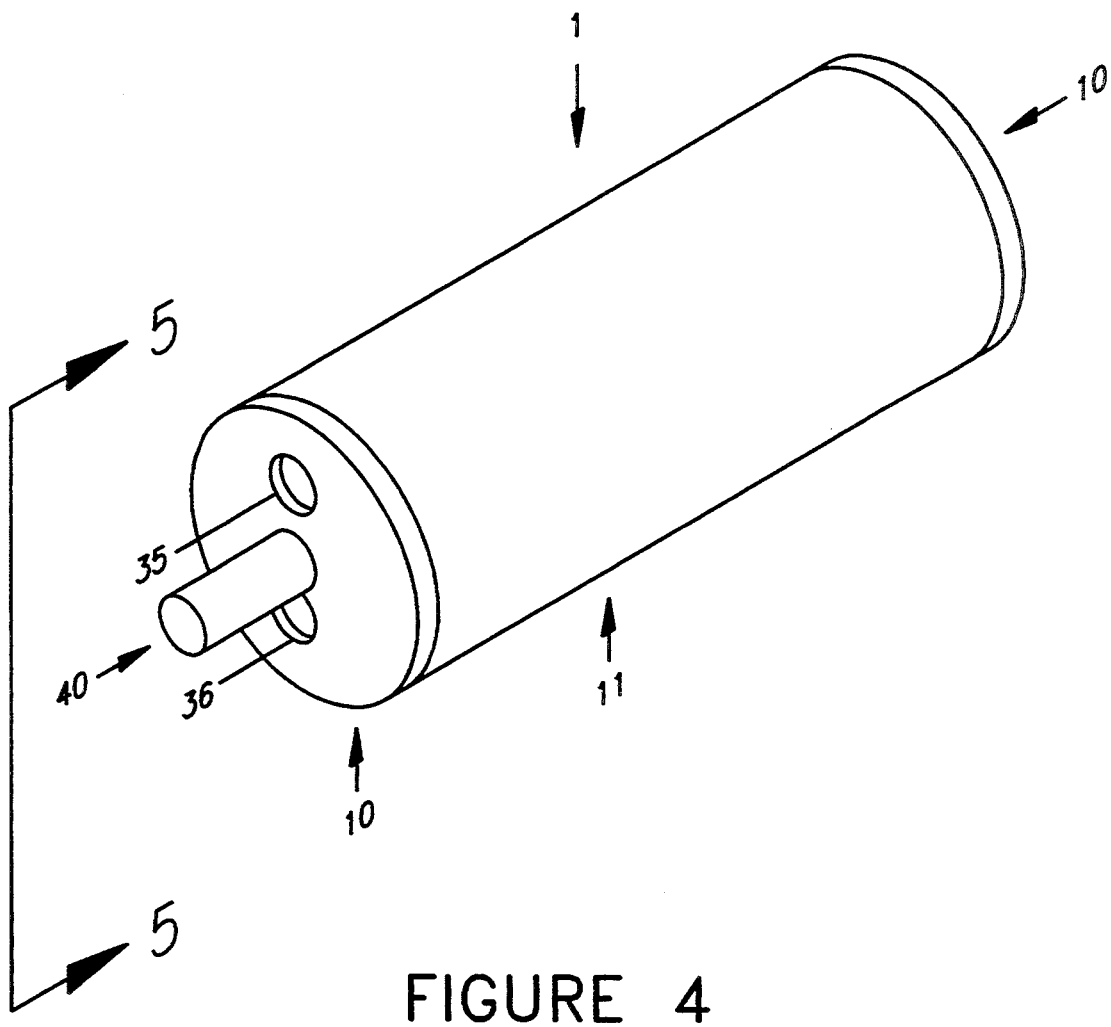
FIG. 4 is an isometric view of a second embodiment of the ceramic cylinder pressure housing with permanently bonded metal endcaps fitted with an endcap rotating tool and apertures for electrical and mechanical penetrations of the pressure boundary.

FIG. 4 illustrates an embodiment of the ceramic pressure housing 1 in which apertures 35 and 36 have been machined into the metallic endcap 10 to provide electrical or mechanical feed-through capability. Also illustrated in FIG. 4 is an endcap rotating tool 40 that is used to rotate the metallic endcap 10 during application of the bonding agent 20.

Figure 5:
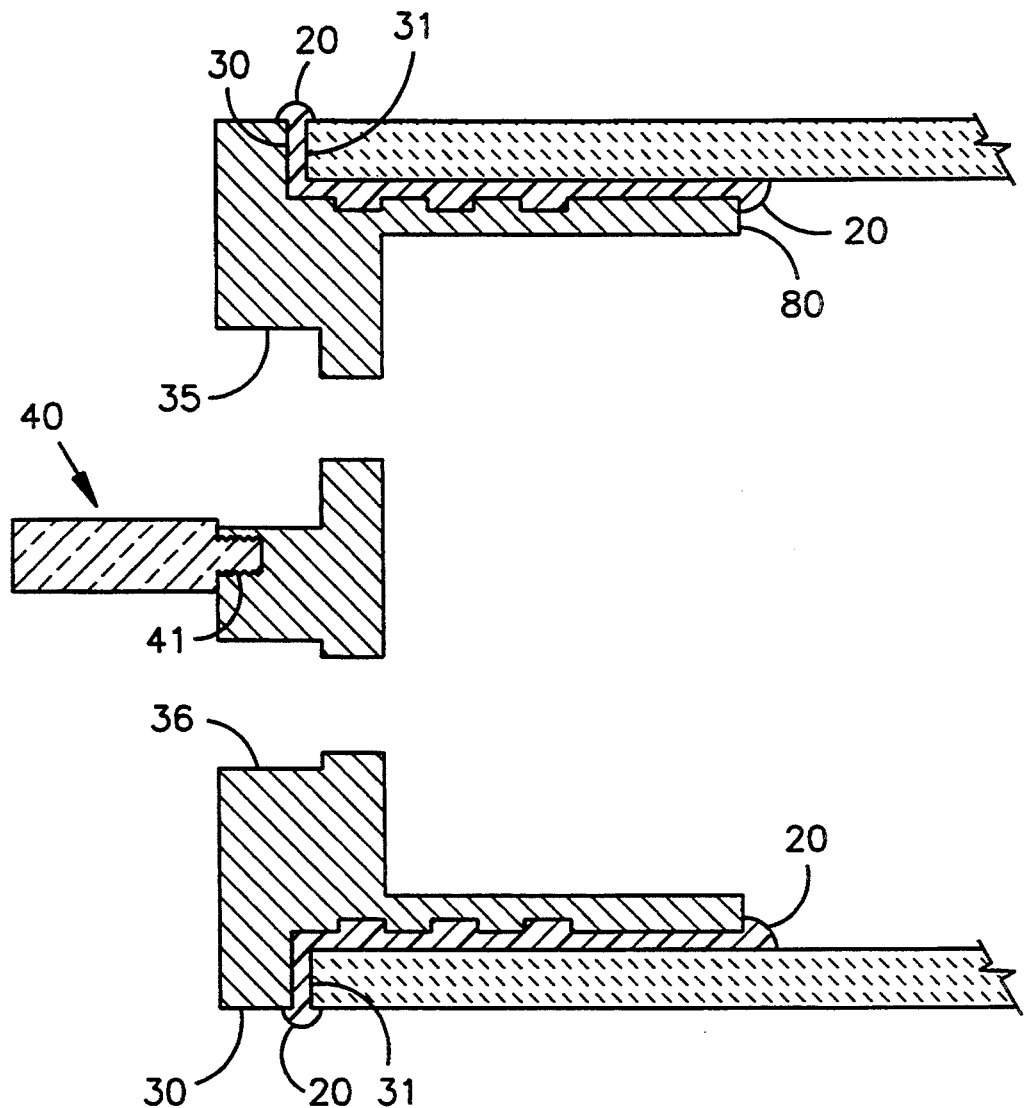
FIG. 5 is a partial cross sectional view along line 5—5 illustrating the ceramic cylinder pressure housing with permanently bonded metal endcaps shown in FIG. 4.
Figure 6:
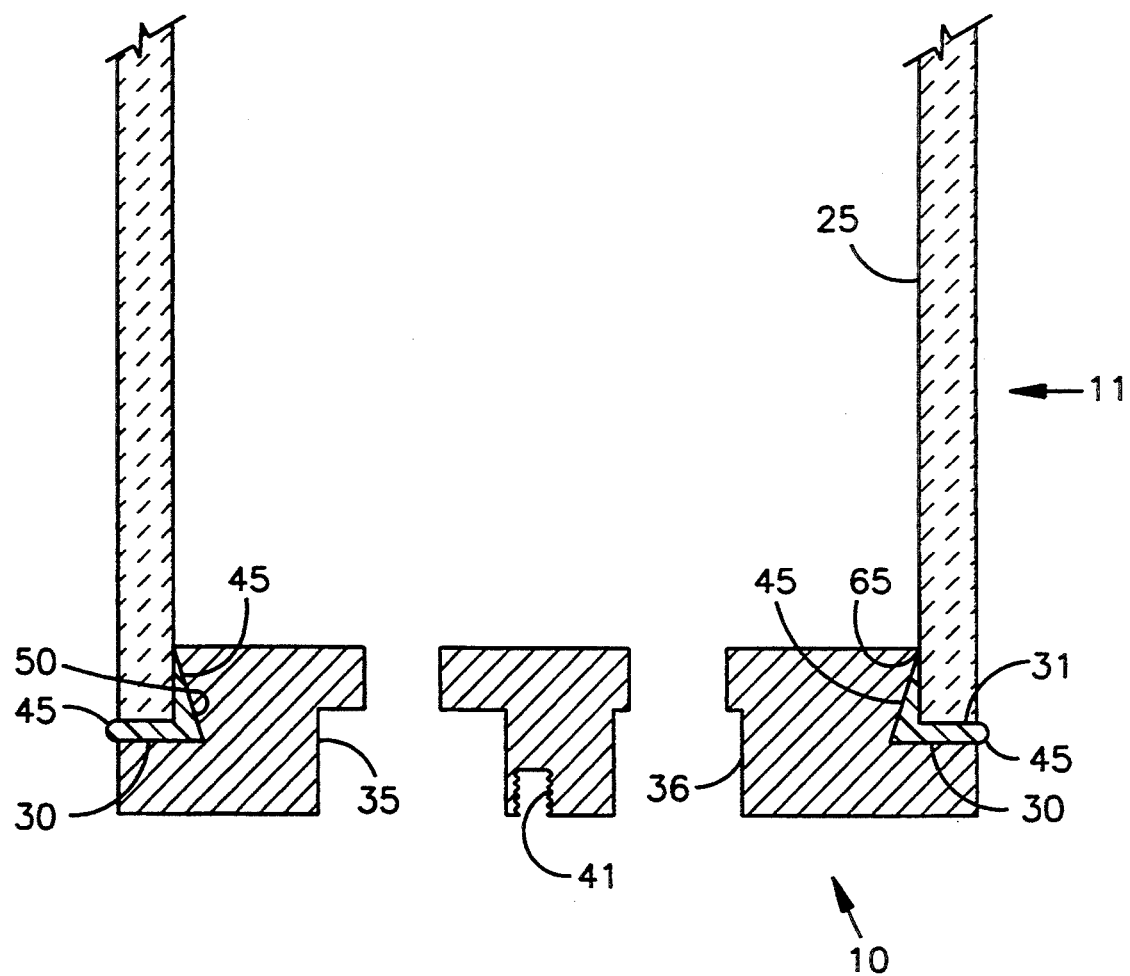
FIG. 6 is a partial cross sectional view along line 5—5 illustrating the third embodiment of the ceramic cylinder pressure housing with permanently bonded metal endcaps that is shown in FIG. 4.

The endcap rotating tool 40 fits into the endcap rotating tool attachment point 41 as shown in FIGS. 5 and 6. The endcap rotating tool 40 is used to turn the metallic endcap 10 prior to bonding so that a uniform layer of bonding agent 20 can be interspaced between the metallic endcap 10 and the ceramic cylinder 11 in the same manner in the first embodiment. FIG. 5 illustrates a typical arrangement of apertures 35 and 36 in an metallic endcap 10. Apertures 35 and 36 allow for electrical and mechanical connections to instruments located within the ceramic pressure housing 1.

THIRD EMBODIMENT

FIG. 6 illustrates a third embodiment of the invention. The metallic endcap 10 is machined such that the ceramic cylinder inner surface 25 of the ceramic cylinder 11 and the endcap fitting surface 50 creates an annular wedge shaped section of bonding agent 45. The preferred angle formed by this machining is from approximately 3° to 8° in slope. Angles within this range will not cause excessive bending of the ceramic cylinder 11 and at the same time allow for sufficient pressure to be applied to the bonding agent 20 as a result of the high pressure fluid environment.

Figure 7:
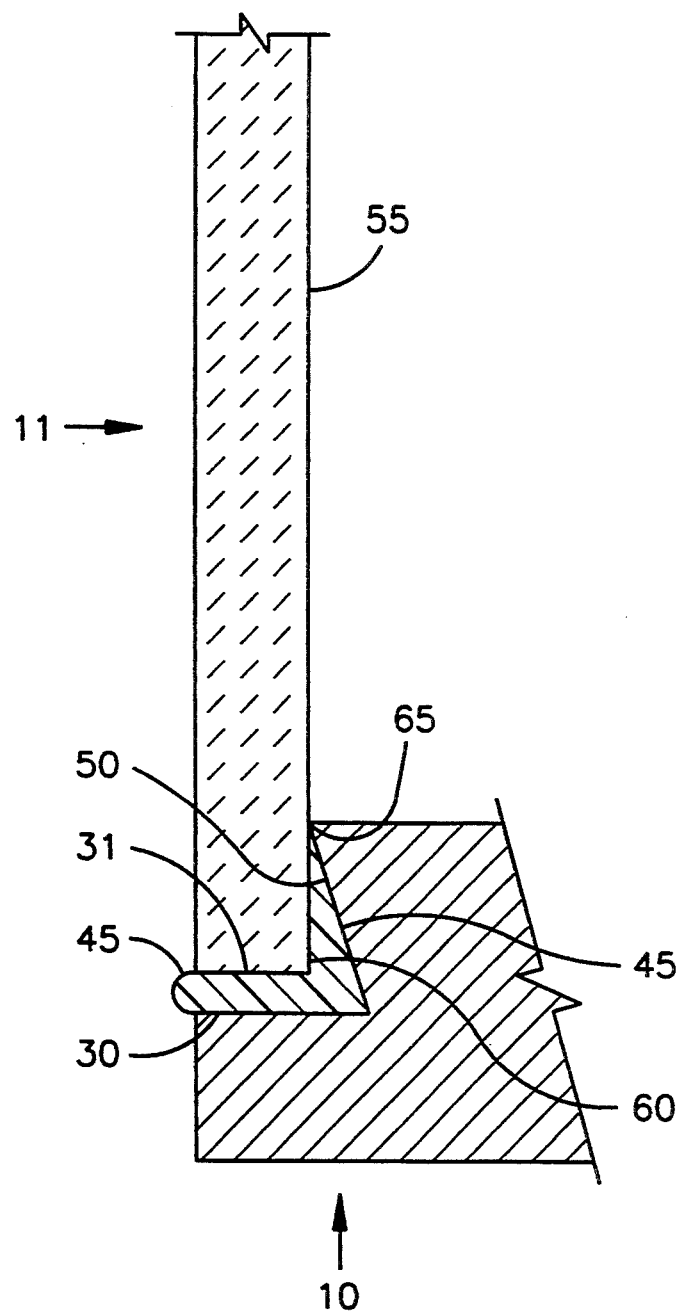
FIG. 7 is an enlarged partial cross sectional view along line 5—5 of the ceramic cylinder pressure housing shown in FIG. 6.

A unique feature of the third embodiment is demonstrated by FIG. 7 which illustrates that as external pressure increases, the annular wedge shaped section of bonding agent 45 is placed in compression which acts to increase the seal between the ceramic cylinder 11 and the metallic endcap 10, and to transmit forces from the ceramic cylinder 11 to the metallic endcap 10. As in the first embodiment, the endcap lip 30 provides a load bearing surface at the ceramic cylinder end surface 31. As in the other embodiments, as the fluid pressure increases, it increases the integrity of the seal between the endcap lip 30 and the ceramic cylinder end surface 31. The thickness of the endcap lip 30 should be dimensioned such that mechanical failure of the endcap does not occur at the design pressures under consideration. It should be noted that as pressure increases the metallic endcap 10 and the ceramic cylinder 11 are forced toward each other. Simultaneously, the forward interior end of the ceramic cylinder 60 is pushed toward the endcap fitting surface 50. As pointed out previously, the preferred angle between the endcap fitting surface 50 and the forward end of the ceramic cylinder 60 is 3° with endcap pivot point 65 being the intersection point of the surfaces for measurement of the angle. Angles from approximately 3° to 8° will yield satisfactory results.

In the existing art of pressure housings, endcaps are sometimes beveled. However, these bevels are to increase the ease in welding. Welding is not used in the existing application.

One bonding agent 45 found to be suited for this embodiment is Hysol Electronic Chemicals EE4183 and HD3561 or EE4186 and HD3561. This bonding agent 45 is applied to the metallic endcap 10 and ceramic cylinder 11 in a series of steps.

The endcap fitting surface 50 and the interior surface portion 55 of ceramic cylinder 11 are etched with 220 grit wet/dry sandpaper. A degreasing agent is then used to thoroughly clean both the endcap fitting surface 50 and the interior portion of the forward end 60 of the ceramic cylinder 11. The surfaces are then wiped with a solvent such as acetone in preparation for application of the bonding agent 45. The two-part Hysol epoxy casting system resin which is used as one part of the mixture used in this bonding agent 45 is then thoroughly mixed with its hardening agent in a closed, gas-free environment or in a mixing pan. If mixing takes place in a shallow pan, the resin is degassed in a vacuum for a period of approximately 20 minutes prior to mixing with its hardening agent. Degassing at a vacuum of approximately 29.0" Hg is preferred in order to ensure nearly all entrained gas bubbles are removed from the resin. The components are then mixed and subsequently poured into a syringe type applicator. The mixture is degassed while in the syringe applicator for a period of 20 minutes. The mixture is then allowed to sit for approximately 80 minutes to achieve the viscosity required for application to the endcap and ceramic tube. The bonding agent 45 is first applied to the sealing surface of the ceramic tube in a thin coating which completely covers the surface to be bonded. Bonding agent 45 is then applied from the syringe applicator to the endcap sealing surface, and the metallic endcap 10 is rotated about its axis to generate a uniformly thick coating of bonding agent 45 on the surface. The volume of bonding agent 45 applied to the metallic endcap 10 should be sufficient to completely fill the void space between the metallic endcap 10 and ceramic cylinder when assembled. As in other embodiments, the metallic endcap 10 is inverted until gravitational flow causes the bonding agent 45 to form a bead 72 of bonding agent 45 about the lower edge of the endcap 80.

The metallic endcap 10 is then inserted into position by pressing it into the ceramic cylinder 11. The clearance that exists between the endcap lip 30 and the ceramic cylinder end surface 31 is approximately 0.002" which ensures that mechanical integrity of the bonding agent 45 exists while minimizing the size of the annular wedge shaped section of bonding agent 45 which exists between the metallic endcap 10 and the ceramic cylinder 11. The endcap is pressed into the ceramic tube in a manner which allows a thin film of bonding agent 45 to remain between the endcap lip and the ceramic tube. The thickness of this film is controlled to a thickness of approximately 0.010". This thin coating of bonding agent will compensate for any imprecisions in machining which can result in stress concentrations if the endcap and ceramic is in direct contact. The excess bonding agent 45 is wiped from the outside of the ceramic tube. The ceramic tube is then inverted such that the endcap is located at the bottom of the assembly for curing of the bonding agent 45. Inversion of the ceramic tube prevents the bonding agent 45 from flowing out of the sealing area between the ceramic cylinder 11 and the metallic endcap 10. The assembly is then degassed for a period of 10 minutes and the bonding agent 45 is cured at a temperature of 130 degrees F. for a period of 4 hours. The opposing metallic endcap 10 is installed in a like manner.

FOURTH EMBODIMENT

Figure 8:
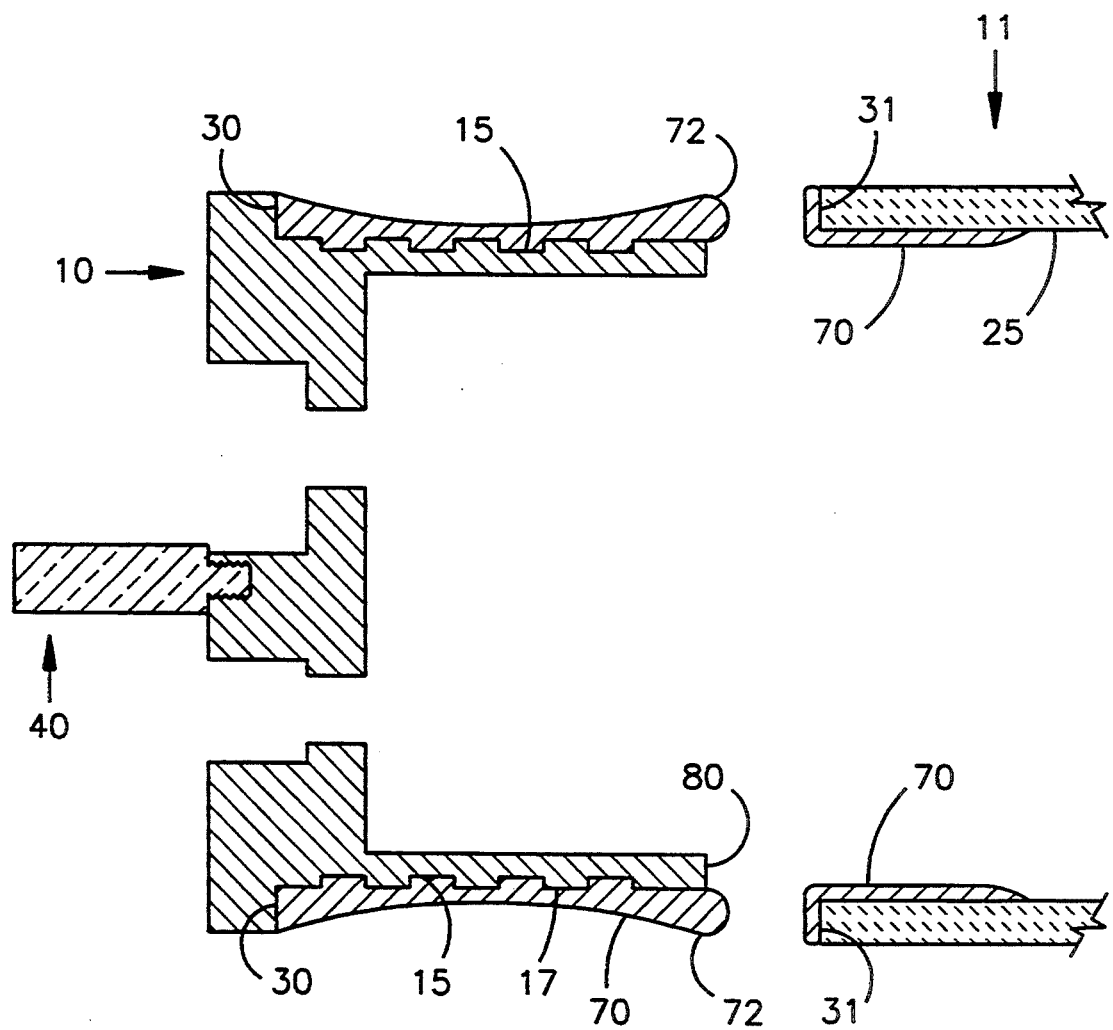
FIG. 8 is a partial cross sectional view along line 5—5 illustrating a fourth embodiment of the ceramic cylinder pressure housing with permanently bonded metal endcaps in which the endcap and ceramic cylinder are prepared for assembly.
Figure 9:
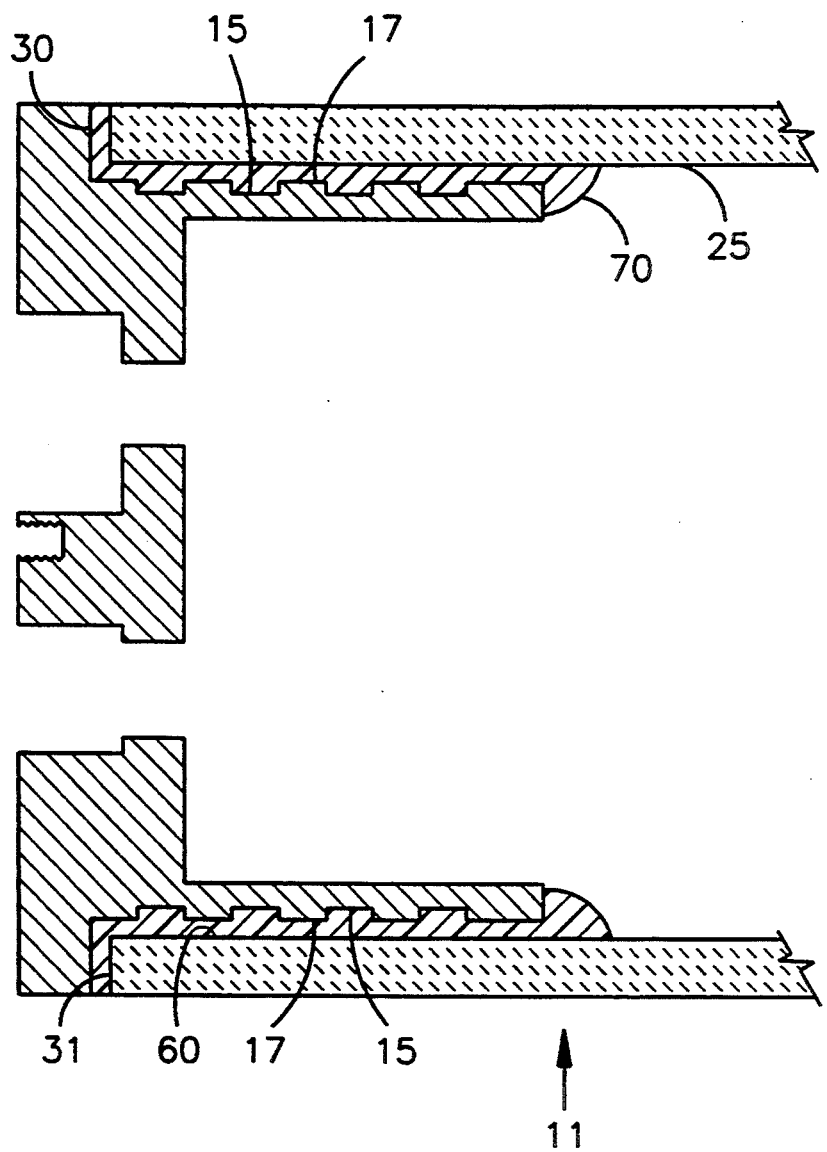
FIG. 9 is a partial cross sectional view along line 5—5 illustrating a fifth embodiment of the ceramic cylinder pressure housing with permanently bonded metal endcaps in which the endcap and ceramic cylinder shown in FIG. 8 are assembled.

FIG. 8 illustrates the fourth embodiment of the invention. FIG. 4 illustrates the appearance of this embodiment in assembled form. In the method of this sealing mechanism, the bonding surfaces of the endcap are etched with 220 grit wet/dry sandpaper. Next is the application of a degreasing agent used to thoroughly clean both the metallic endcap 10 and ceramic cylinder 11 sealing surfaces. The next step is applying the bonding agent 70 to the endcap sealing surface 17, into which endcap grooves 15 have been machined. The best mode of applying the bonding agent 70 is to rotate the metallic endcap 10 using the centrally located, temporarily installed endcap rotating tool 40 while applying an acid brush (not shown) coated with the bonding agent 70. This step causes a uniformly thick coating of bonding agent to be formed on the surface. The volume of bonding agent 70 applied to the endcap should be sufficient to completely fill the space between the metallic endcap be and ceramic cylinder 11. The metallic endcap 10 is then inverted until gravitational flow causes the bonding agent 70 to form a bead 72 about the interior edge of the endcap 80. The metallic endcap 10 is then inserted into the ceramic cylinder 11 as illustrated in FIG. 9. The clearance between the metallic endcap 10 and the ceramic cylinder 11, as measured from the endcap sealing surface 17 and ceramic cylinder inner surface 25 is preferred to be approximately 0.030". The clearance between the endcap lip 30 and the ceramic cylinder end surface 31 should be approximately 0.010". These distances ensure that the end cap 10 can be freely inserted into the ceramic cylinder 11, and that mechanical integrity of the bonding agent exists while minimizing the transference of forces from the endcap to the ceramic cylinder 11. Excess bonding agent should be wiped from the outside of the ceramic pressure housing 1.

The ceramic pressure housing 1 is then inverted such that the endcap is located at the bottom of the assembly for curing of the bonding agent 70. Inversion prevents the bonding agent from flowing out of the sealing area between the ceramic cylinder 11 and metallic endcap 10. The bonding agent is allowed to cure in accordance with the manufacturers specifications.

OTHER EMBODIMENTS POSSIBLE

In each of the embodiments discussed, the metallic endcap 10 on the opposing end of the ceramic cylinder 11 is attached in the same manner.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A housing for the containment of instrumentation in a high pressure fluid environment wherein the improvement comprises:
   a metallic endcap having an endcap lip and an endcap sealing surface;
   a ceramic cylinder having a ceramic cylinder end surface and a ceramic cylinder inner surface;
   a bonding agent applied to said endcap sealing surface and endcap lip, and to said ceramic cylinder end surface and ceramic cylinder inner surface;
   the metallic endcap fitting within the ceramic cylinder, such that when said housing in placed in said pressure fluid environment, said endcap lip is forced toward and against said ceramic cylinder end surface placing said bonding agent in compression; and
wherein the seal integrity increases as the fluid pressure increases.

2. The housing in claim 1 wherein the metallic endcap defines apertures which allow for electrical and mechanical penetrations.

3. The housing in claim 1 wherein said endcap sealing surface has transverse grooves and is oppositely opposed from said ceramic cylinder inner surface.

4. The housing in claim 1 wherein said endcap sealing surface oppositely opposed from said ceramic cylinder inner surface at an angle.

5. The housing in claim 4 wherein said endcap fitting surface oppositely opposed from said ceramic cylinder inner surface at an angle of from 3° to 8°.

* * * * *

UNITED STATES PATENT AND TRADEMARK OFFICE
CERTIFICATE OF CORRECTION

PATENT NO.  : 5,427,268
DATED       : June 27, 1995
INVENTOR(S) : Downing Jr., et al It is certified that error appears in the above-indentified patent and that said Letters Patent is hereby corrected as shown below:

In column 3, line 65, after the word "grooves", please insert --15.--.
In column 4, line 3, replace the word "be" with --10--.
In column 6, line 42, after the word "cylinder", please insert --11--.
In column 7, line 26, replace the word "be" with --10--.

Signed and Sealed this

Twenty-eighth Day of May, 1996

Attest:

BRUCE LEHMAN

*Attesting Officer*        *Commissioner of Patents and Trademarks*